US011165344B2

(12) United States Patent
Chang

(10) Patent No.: US 11,165,344 B2
(45) Date of Patent: Nov. 2, 2021

(54) PFM CONTROLLER FOR A MULTI-LEVEL CONVERTER UTILIZING FLYING CAPACITOR VOLTAGE MONITORS

(71) Applicant: SILEGO TECHNOLOGY INC., Wilmington, DE (US)

(72) Inventor: Kevin Yi Cheng Chang, Chandler, AZ (US)

(73) Assignee: SILEGO TECHNOLGY INC., Wilmington, DE (US)

( * ) Notice: Subject to any disclaimer, the term of this patent is extended or adjusted under 35 U.S.C. 154(b) by 0 days.

(21) Appl. No.: 16/731,721

(22) Filed: Dec. 31, 2019

(65) Prior Publication Data

US 2021/0203223 A1   Jul. 1, 2021

(51) Int. Cl.
   *H02M 3/07*   (2006.01)
(52) U.S. Cl.
   CPC .................... *H02M 3/073* (2013.01)
(58) Field of Classification Search
   CPC ....................... H02M 3/07–2003/078
   See application file for complete search history.

(56) References Cited

U.S. PATENT DOCUMENTS

| 10,003,261 | B2 | 6/2018 | Petersen et al. | |
| 2017/0163157 | A1 | 6/2017 | Petersen | |
| 2018/0083531 | A1* | 3/2018 | Nguyen | H02M 3/07 |
| 2020/0389132 | A1* | 12/2020 | Khlat | H02M 3/1584 |
| 2020/0395852 | A1* | 12/2020 | Yoo | H02M 3/1584 |

OTHER PUBLICATIONS

Zhang, et al., "Multilevel Non-Inverting Buck-Boost Converter With Low-Frequency Rippleshaping Based Controller for Operating in Step-Down/Step-Up Transition Region," IEEE 19th Workshop on Control and Modelling for Power Electronics (COMPEL), Jun. 2018.

P'Erez-Nicoli, et al., "A Series-Parallel Switched Capacitor Step-Up DC-DC Converter and its Gate-Control Circuits for Over the Supply Rail Switches," IEEE 5th Latin American Symposium on Circuits and Systems (LASCAS), Feb. 2014.

Forouzesh, et al., "A Survey on Voltage Boosting Techniques for Step-Up DC-DC Converters", 2016 IEEE Energy Conversion Congress and Exposition (ECCE), Sep. 2016.

Cassidy, Brian Michael, "A Constant ON-Time 3-Level Buck Converter for Low Power Applications", Blacksburg, Virginia, Jan. 30, 2015.

(Continued)

*Primary Examiner* — Peter M Novak
(74) *Attorney, Agent, or Firm* — Haynes and Boone, LLP.

(57) ABSTRACT

Disclosed is an interleaved buck-boost converter. The interleaved buck-boost converter comprises a multi-level direct current (DC) to DC converter (MLDC converter), a flying capacitor monitor, and a voltage-level controller. The MLDC converter includes the IMPM and the IMPM includes the flying capacitor. The flying capacitor monitor is in signal communication with the flying capacitor and the voltage-level controller is in signal communication with the flying capacitor monitor. The flying capacitor monitor compares a flying capacitor voltage of the flying capacitor and switches a state of operation of the MLDC converter if the flying capacitor voltage is less than a first flying capacitor reference voltage.

18 Claims, 4 Drawing Sheets

(56) References Cited

OTHER PUBLICATIONS

Sahu, et al., "An Accurate, Low-Voltage, CMOS Switching Power Supply with Adaptive On-Time Pulse-Frequency Modulation (PFM) Control", Circuits and Systems I: Regular Papers, IEEE, vol. 54, Mar. 2007.

Villar et al., "Monolithic Integration of a 3-Level DCM-Operated Low-Floating-Capacitor Buck Converter for DC-DC Step-Down Conversion in Standard CMOS", IEEE Annual Power Electronics Specialists Conference, Jul. 2008.

\* cited by examiner

PFM CONTROLLER FOR A MULTI-LEVEL CONVERTER UTILIZING FLYING CAPACITOR VOLTAGE MONITORS

BACKGROUND

1. Technical Field

This application relates to multi-level power converters, and more particularly to multi-level power converters with regulated output voltages.

2. Prior Art

A typical computing power supply for laptops and related devices such as tablets uses a combination of Lithium Ion (Li-Ion) batteries, usually arranged in groups of two cells in series that produces a maximum voltage of approximately 10 Volts (V). Such a relatively high voltage is unsuitable for modem integrated circuits so mobile personal computers (PCs) conventionally include a buck converter to regulate the battery power supply voltage from the series-connected batteries to an internal power supply voltage such as 1 V for powering the integrated circuits within the device.

A single stage multi-phase buck converter requires high voltage components to step down from such a relatively high battery power supply voltage to the relatively low internal power supply voltage. The use of such high voltage components demands substantial die space to reduce drain to source resistance and also leads to higher gate drive losses and voltage-current overlap switching losses for the power switches. Thus, single stage multi-phase buck converters are not very efficient in applications in which the output voltage is substantially stepped down from, for example, around 10V to 1V.

To improve the efficiency, multi-level buck converters having multi-stages have been used. A first stage comprises a step-down switched capacitor (charge pump) stage that converts the input voltage from the batteries into an intermediate charge pump output voltage. A second stage converts the intermediate charge pump output voltage into the regulated internal power supply voltage. But the efficiency of such multi-stage power converters at a low output load and/or higher boost outputs is a problem.

In addition, additional switches are needed in multi-level buck converters that cause control problems from the increased regulation complexity for the multi-level buck converters that have a nonlinear conversion function. Moreover, at high duty-cycles, proper loop compensations for these types of converters is also a problem. Furthermore, many known multi-level buck converters need to be individually configured with different functional modes of operation to cover the specified input and output voltages due to the lack of an effective mechanism to detect and regulate the multi-level buck converter in wide voltage-ranges during system operations.

SUMMARY

Disclosed is an interleaved buck-boost converter. The interleaved buck-boost converter comprises an input voltage terminal, output filter, master switching stage, slave switching stage, and a controller. The input voltage terminal is configured to provide an input voltage from a voltage source and the output filter includes an inductor having an input terminal and an output capacitor for an output voltage. The master switching stage includes a first flying capacitor and the slave switching stage includes a second flying capacitor. The controller is configured during a boost mode of operation to configure the master switching stage into a master magnetizing switching state in which the input terminal is charged to a first multiple of the input voltage responsive to the output voltage being less than a first threshold voltage. The controller is further configured to configure the slave switching stage into a slave de-magnetizing switching state in which the input terminal is charged to a second multiple of the input voltage responsive to a first flying capacitor voltage for the first flying capacitor being less than a second threshold voltage. The second multiple of the input voltage being less than the first multiple of the input voltage.

In an example of operation, the IMPFM power converter performs a method that comprises monitoring the flying capacitor voltage, with the flying capacitor monitor, of the flying capacitor, comparing the flying capacitor voltage with the first flying capacitor reference voltage, and switching the state of operation of the MLDC converter if the flying capacitor voltage is less than the first flying capacitor reference voltage.

Also disclosed is a control system for controlling the IMPFM power converter. The control system comprises flying capacitor monitor and the voltage-level controller. The flying capacitor monitor is configured to compare the flying capacitor voltage of the flying capacitor and switches the state of operation of the MLDC converter if the flying capacitor voltage is less than a first flying capacitor reference voltage.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

An interleaved buck-boost converter is disclosed. The interleaved buck-boost converter comprises an input voltage terminal, output filter, master switching stage, slave switching stage, and a controller. The input voltage terminal is configured to provide an input voltage from a voltage source and the output filter includes an inductor having an input terminal and an output capacitor for an output voltage. The master switching stage includes a first flying capacitor and the slave switching stage includes a second flying capacitor. The controller is configured during a boost mode of operation to configure the master switching stage into a master magnetizing switching state in which the input terminal is charged to a first multiple of the input voltage responsive to the output voltage being less than a first threshold voltage. The controller is further configured to configure the slave switching stage into a slave de-magnetizing switching state in which the input terminal is charged to a second multiple of the input voltage responsive to a first flying capacitor voltage for the first flying capacitor being less than a second threshold voltage. The second multiple of the input voltage being less than the first multiple of the input voltage.

In this example, the controller may be further configured during a buck mode of operation to configure the slave switching stage into a slave magnetizing switching state in which the input terminal is charged to the input voltage responsive to the output voltage being less than a third threshold voltage. Moreover, the controller may be further configured to configure the master switching stage into a master de-magnetizing switching state in which the input terminal is discharged to ground responsive to a second flying capacitor voltage for the second flying capacitor being less than a fourth threshold voltage.

In this example, the interleaved buck-boost converter is shown as of an Interleaved multi-level pulse-frequency-modulated (IMPFM) power converter and the master switching stage and the slave switching stage are shown as interleaved multi-level power modules (IMPMs) where the master switching stage is shown as a first IMPM and the slave switching stage is shown as a second IMPM. The IMPMs are also shown as part of a multi-level DC-DC MLDC converter (MLDC converter).

Figure 1:
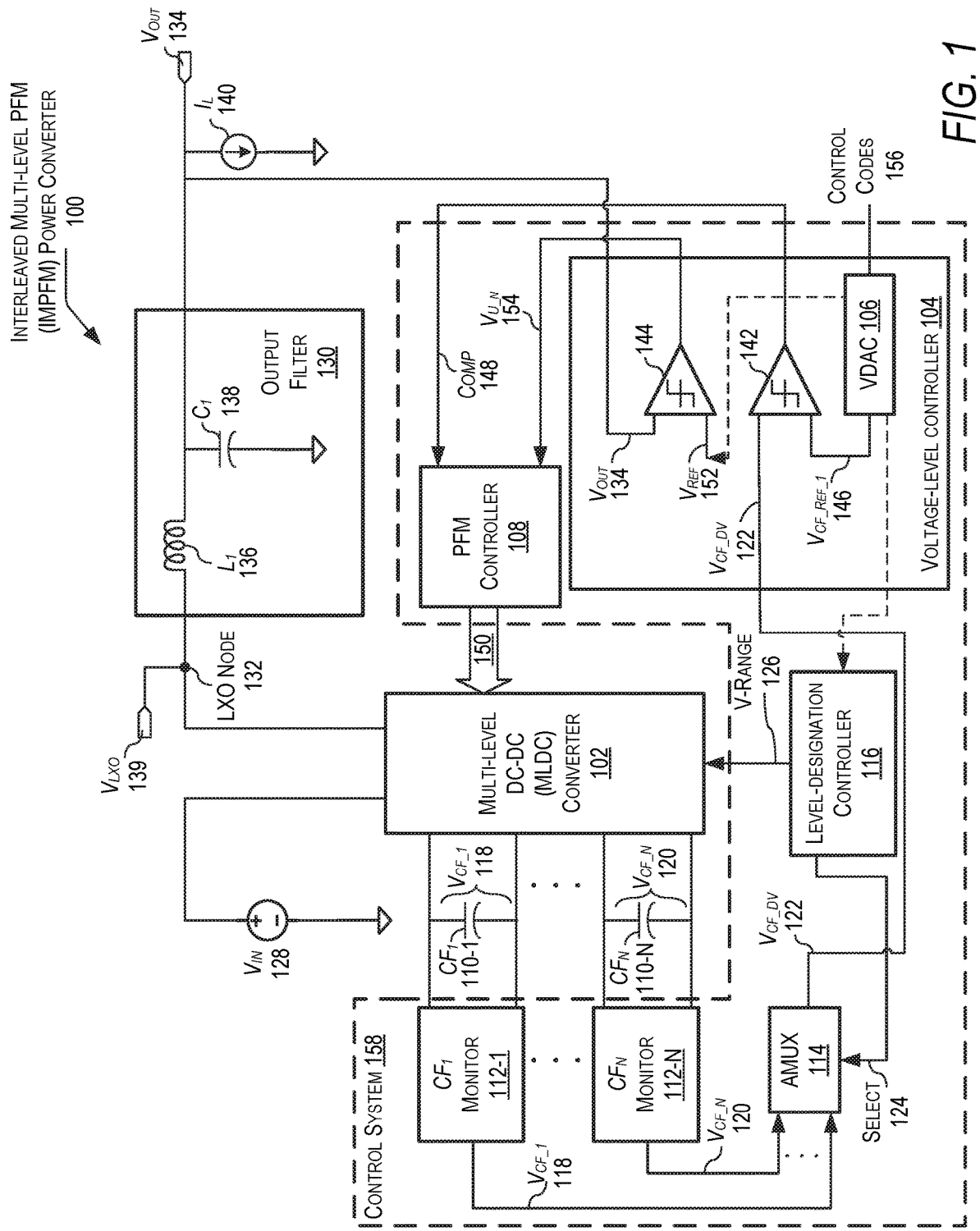
FIG. 1 is a system block diagram of an example of an implementation of an interleaved multi-level pulse frequency modulated (IMPFM) power converter in accordance with the present disclosure.

Specifically, turning to FIG. 1, a system block diagram of an example of an implementation of an IMPFM power converter 100 is shown in accordance with the present disclosure. The IMPFM power converter 100 comprises a MLDC converter 102 and a voltage-level controller 104. The MLDC converter 102 includes a plurality of N switching stages (i.e., IMPMs) each having its own flying capacitor 110. For illustration clarity, only a first flying capacitor $CF_1$ 110-1 and an Nth flying capacitor $CF_N$ 110-N are shown in MLDCS 102. In general, the voltage-level controller 104 monitors the flying capacitor voltages, where the voltage-level controller 104 switches a mode of operation of the MLDC converter 102 if a selected one of the flying capacitor voltages is less than a first flying capacitor reference voltage. Voltage-level controller 104 also includes a voltage digital-to-analog converter (VDAC) 106.

IMPFM 100 also includes a pulse frequency modulation (PFM) controller 108, a plurality of flying capacitor monitors arranged from a $CF_1$ monitor 112-1 through a $N^{th}$ $CF_N$ monitor 112-N, an analog multiplexer (AMUX) 114, and a level-designation controller 116. Moreover, each flying capacitor has a corresponding flying capacitor voltage. For example, $CF_1$ 110-1 has as first flying capacitor voltage $V_{CF\_1}$ 118 and the $CF_N$ 110-N has a flying capacitor voltage of $V_{CF\_N}$ 120.

In this example, the $CF_1$ monitor 112-1 is in signal communication with the $CF_1$ 110-1 electrically connecting the $CF_1$ monitor 112-1 to both a top and bottom plates of the $CF_1$ 110-1. The $CF_N$ monitor 112-N is in signal communication with the $CF_N$ 110-N electrically connecting the $CF_N$ monitor 112-N to both a top and bottom plates of the $CF_N$ 110-N. Similarly, other flying capacitor monitors (not shown) of the plurality of flying capacitor monitors are also individually electrically connected to the top and bottom plates of the corresponding flying capacitor.

Each flying capacitor monitor measures the corresponding flying capacitor voltage of the corresponding flying capacitor and outputs a measured corresponding flying capacitor voltage to the AMUX 114. The AMUX 114 is a multiplexor that selects between the plurality of received analog input signals (i.e., the measured corresponding flying capacitor voltages) and forwards the selected measured flying capacitor voltage ($V_{CF\_DV}$) 122 to the voltage-level controller 104. The AMUX 114 selects the $V_{CF\_DV}$ 122 based on a selection signal 124 produced by the level-designation controller 116. The level-designation controller 116 also produces voltage-range of operation signal (V-Range) 126 to drive a voltage-range of operation of the MLDC converter 102.

Furthermore, in this example, the MLDC converter 102 is in signal communication with an input voltage source ($V_{IN}$) 128 and an output filter 130 at an LXO output node 132. The output filter 130 produces an output voltage ($V_{Out}$) 134 and includes an output inductor 136 and output capacitor 138 and is in signal communication with a load that draws a load current ($I_L$) 140. In general, the $V_{Out}$ 134 is a filtered version of the switch node voltage ($V_{LXO}$ 139) at the LXO output node 132.

Moreover, the voltage-level controller 104 includes a first comparator 142 and a second comparator 144. The comparator 142 is configured to compare the flying capacitor voltage $V_{CF\_DV}$ 122 against a reference flying capacitor voltage ($V_{CF\_Ref\_1}$) 146 and, in response, produce a flying capacitor comparison signal (COMP) 148 that is output to the PFM controller 108. The PFM controller 108 then sends a control signal 150 to the MLDC converter 102 to control and potentially switch the state of operation of the MLDC converter 102. The second comparator 144 is configured to compare the output voltage $V_{Out}$ 134 to a reference output voltage ($V_{Ref}$) 152 and, in response, produce an output comparison signal ($V_{U\_N}$) 154 that is also output to the PFM controller 108.

The voltage-level controller 104 may include, or be in signal communication with, the VDAC 106. As an example, the VDAC 106 may be in signal communication with the first threshold detector 142 and the optional second threshold detector 144. The VDAC 106 is configured to receive control codes 156 and, in response, produce the flying capacitor reference voltage $V_{CF\_Ref\_1}$ 146 and the output reference voltage $V_{Ref}$ 152.

In this example, the control system 158 is a PFM control loop that utilizes a timing-based approach that defines a first toggling interval of a discharging phase for a switched-capacitor (i.e., $C_1$ 138) or magnetizing phase for the $L_1$ 136 with a decremental flying capacitor voltage (i.e., either $V_{CF\_1}$ 118 through $V_{CF\_N}$ 120 when selected as $V_{CF\_DV}$ 122 by the AMUX 114) and enables the completion of an entire PFM control-loop operational cycle with a valley detection of the output of the MLDC converter 102 through the output filter 130 that includes a LC filtering section (i.e., $L_1$ 136 and $C_1$ 138). This PFM control-loop timing-based approach defines a control scheme utilized by the level-designation controller 116 in performing a level-designation process for the robust output regulation of the IMPFM power converter 100 over available voltage ranges. This allows the IMPFM power converter 100 to be configurable over a wide power range where the ratio of the $V_{IN}$ 128 to output power $V_{Out}$ 134 may vary. By utilizing this approach, the ON-time of the IMPFM power converter 100 is controlled by the flying capacitor regulation (i.e., COMP 148), while the OFF-time is regulated by an outer loop output voltage regulation (i.e., $V_{U\_N}$ 154). As such, the flying capacitor regulation may be maintained over a wide range of operating conditions for the IMPFM power converter 100. Specifically, this PFM control-loop timing-based approach may be applied to higher voltage levels of operation for the IMPFM power converter 100.

Furthermore, in this example, the level-designation controller 116 may alternatively select different flying capacitor voltages via the selection signal 124 applied to the AMUX 114, the V-Range 126 is determined by the level-designation controller 116 based on $V_{Ref}$ 152, $V_{Ref}$ 152 may be determined by the VDAC 106 utilizing the control codes 156, and a $V_{IN}$ 128 detector (not shown) may be combined with the VDAC 106 and control codes 156 to produce a level-designation approach that includes $V_{IN}$ 128 variations. Moreover, the efficiency of the IMPFM power converter 100 may be maintained at an approximately maximum value if the difference in voltage of the flying capacitors between changing and discharging cycles are maintained as small as possible.

As an example of operation, the MLDC converter 102 is controlled by the PFM controller 108 based on the detection results of the two comparators (i.e., first threshold detector 142 and optional second threshold detector 144) that produce COMP 148 and $V_{U\_N}$ 154 that indicate an under-voltage condition of the MLDC converter 102 output (i.e., $V_{LXO}$ 139 at the LXO node 132) and the decremental flying capacitor voltage during the magnetizing (i.e. the discharging of the flying capacitor) cycle, respectively.

When the discharged flying capacitor (e.g., $C_{F1}$ 110-1) presents a lower voltage (e.g., $V_{CF\_1}$ 118) than the pre-defined threshold, $V_{CF\_Ref\_1}$ 146, the first threshold detector toggles and terminates the magnetizing cycle. Therefore, the MLDC converter 102 operation is switched into a de-magnetizing cycle. When $V_{Out}$ 134 drops below the reference voltage, $V_{Ref}$ 152, the optional second threshold detector 144 (that is acting as an under-voltage comparator) switches its logic state and in turn, the PFM control-logic within the PFM controller 108 launches a new operational cycle for a new magnetizing cycle.

In this example, the IMPFM power converter 100 is shown as having an interleaved scheme of a plurality of flying capacitors (i.e., $CF_1$ 110-1 through $CF_N$ 110-N) in signal communication with a plurality of flying capacitor monitors (i.e., $CF_1$ monitor 112-1 through $CF_N$ monitor 112-N). As such, in this interleaved scheme, multiple flying capacitors may be monitored by the control system 158. As discussed earlier, the level-designation controller 116 specifies the active voltage-range (i.e., V-Range 126) for output regulation and also selects (i.e., selection signal 124) the AMUX 114 to connect the corresponding detected flying capacitor voltage (i.e., $V_{CF\_DV}$ 122) to the first threshold detector 142 for the magnetizing cycle.

Figure 2A:
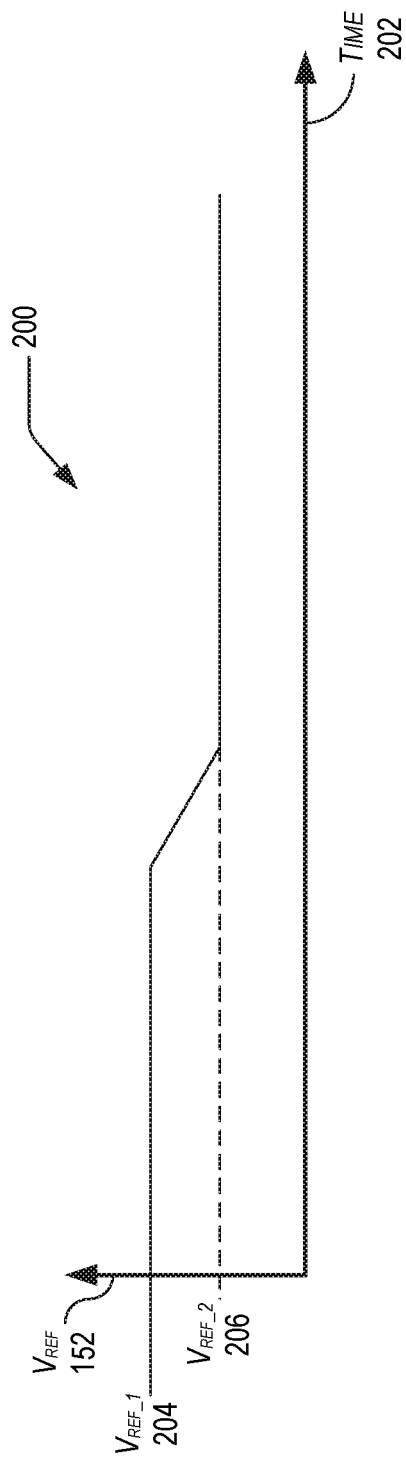
FIG. 2A is a plot of an example of an operational waveform for reference voltages to be utilized by the IMPFM power converter shown in FIG. 1 in accordance with the present disclosure.

In FIG. 2A, a plot of an example of an operational waveform 200 for reference voltages to be utilized by the IMPFM power converter 100 is shown in accordance with the present disclosure. The plot axes are reference voltage (i.e., $V_{Ref}$ 152) versus time 202. In this example, the $V_{Ref}$ 152 may vary between a first reference voltage ($V_{REF\_1}$) 204 and a second reference voltage ($V_{REF\_2}$) 206.

Figure 2B:
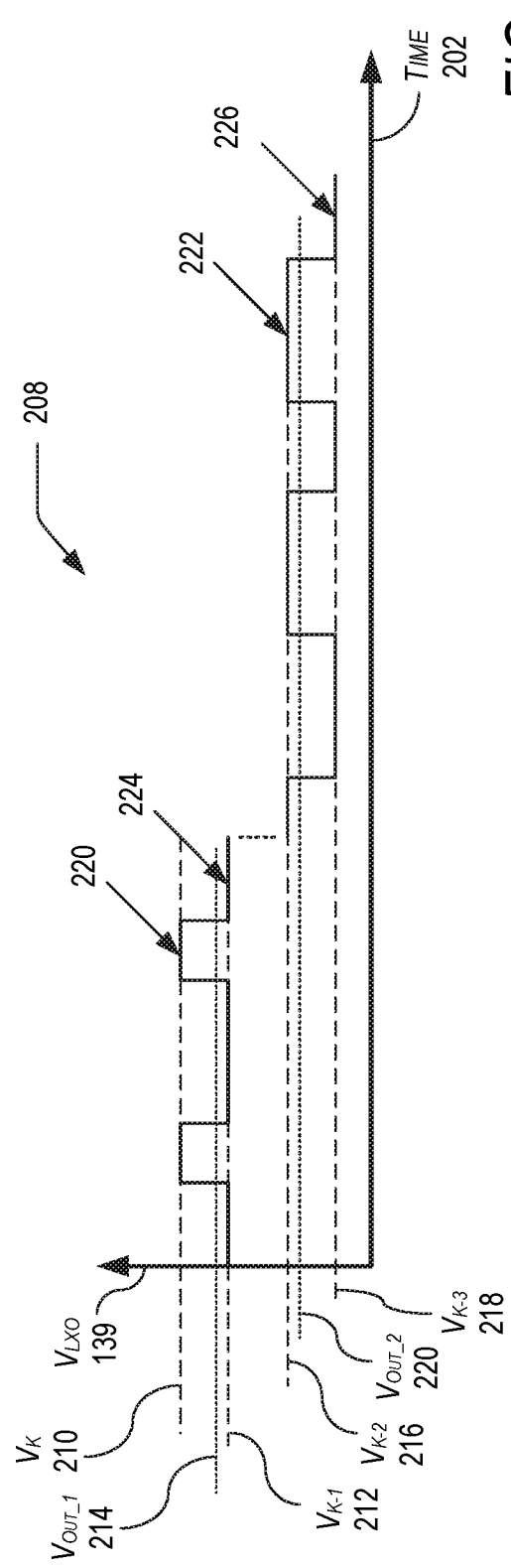
FIG. 2B is a plot of an example of an operational waveform for the selected voltage ranges for output regulation of the IMPFM power converter shown in FIG. 1 in accordance with the present disclosure.

Turning to FIG. 2B, a plot of an example of an operational waveform 208 for the selected voltage ranges for output regulation of the IMPFM power converter 100 is shown in accordance with the present disclosure. The plot axes are voltage (i.e., $V_{LXO}$ 139) versus time 202. In this example, the level-designation controller 116 utilizes a level-designation technique where control codes 156 of the VDAC 106 are utilized to specify a voltage range between two consecutive voltage levels for output regulation. In this example, the two consecutive voltage levels are shown as $V_K$ 210 and $V_{K-1}$ 212 for $V_{REF\_1}$ 204 along with an first average output voltage ($V_{Out\_1}$) 214 at the LXO 132 output node. In addition, two other consecutive voltage levels are also shown as $V_{K-2}$ 216 and $V_{K-3}$ 218 for $V_{REF\_2}$ 206 along with a second average output voltage ($V_{Out\_2}$) 220 at the LXO 132 output node.

In this example, $V_K$ 210 is greater than $V_{REF\_1}$ 204 and $V_{REF\_1}$ 204 is greater than $V_{K-1}$ 212. Moreover, $V_{K-2}$ 216 is greater than $V_{REF\_2}$ 206 and $V_{REF\_2}$ 206 is greater than $V_{K-3}$ 218. From the figures, it is appreciated that points 222 and 224, the circuit (i.e., a IMPM) is magnetizing and at points 226 and 228, the circuit is de-magnetizing. Whenever the reference voltage (i.e., either $V_{REF\_1}$ 204 or $V_{REF\_2}$ 206) is updated, the new voltage-levels will be assigned to the IMPM next voltage regulation cycle. In this example, the highest (or lowest) voltage of the specified levels will be the LXO voltage (i.e., the $V_{LXO}$ 139) for a magnetizing (or de-magnetizing) cycle.

Figure 3:
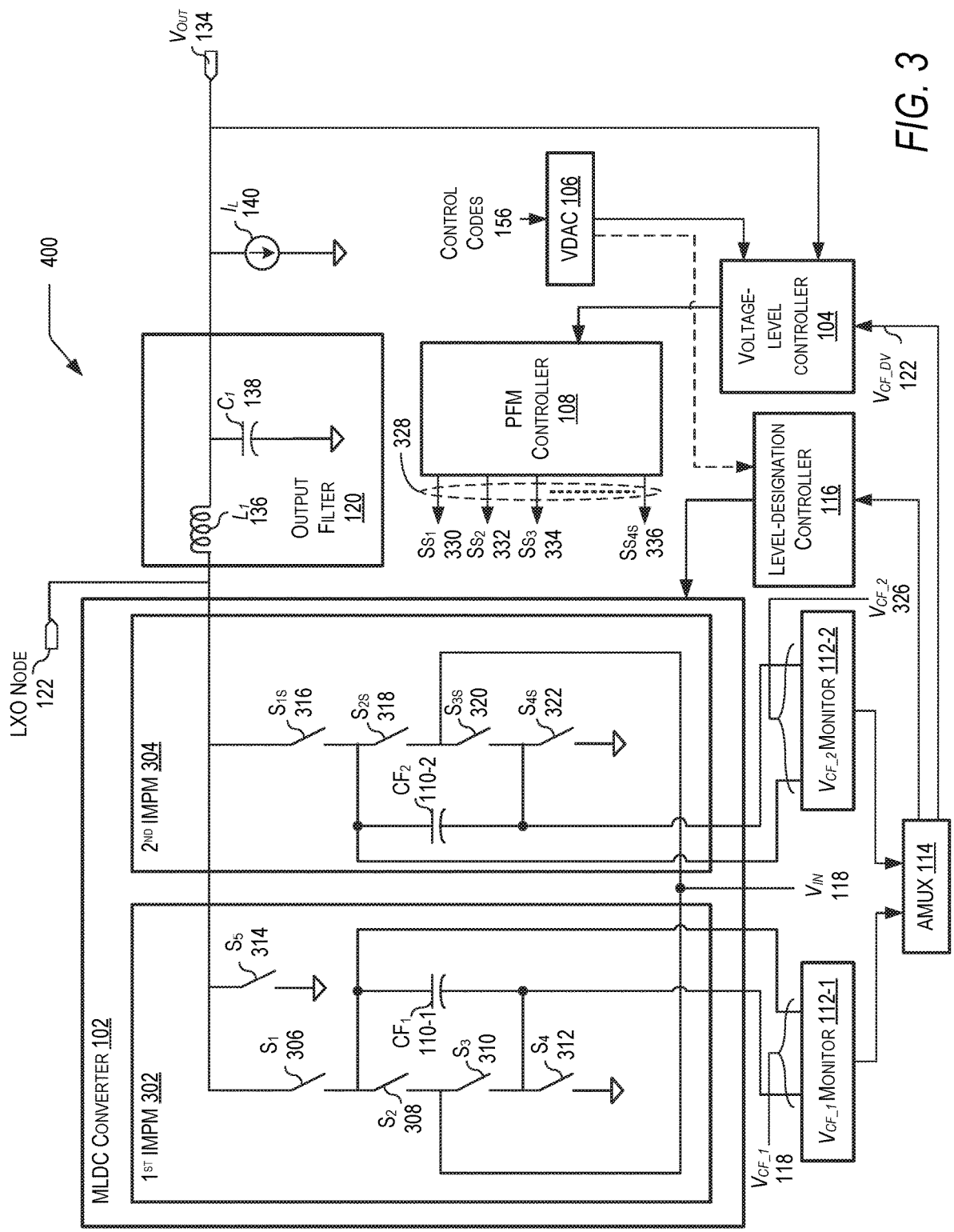
FIG. 3 is a system block diagram of an example of an implementation of a 3-level IMPFM power converter acting as 3-level PFM buck-boost converter in accordance with the present disclosure.

FIG. 3 is a system block diagram of an example of an implementation of a 3-level IMPFM power converter 300 acting as 3-level PFM buck-boost converter in accordance with the present disclosure. In this example, the MLDC converter 102 of the 3-level IMPFM power converter 300 includes a first IMPM 302 and a second IMPM 304, where the first IMPM 302 may act as a "master" and the second IMPM 304 may act as "slave." The first IMPM 302 includes a first switch ($S_1$) 306, second switch ($S_2$) 308, a third switch ($S_3$) 310, fourth switch ($S_4$) 312, fifth switch ($S_5$) 314, and the $CF_1$ 110-1. The second IMPM 304 includes a first slave switch ($S_{1S}$) 316, second switch ($S_{2S}$) 318, a third switch ($S_{3S}$) 320, fourth switch ($S_{4S}$) 322, fifth switch ($S_{5S}$) 324, and a second flying capacitor ($CF_2$) 110-2. The MLDC converter 102 also includes a sixth switch (ST) having a transfer voltage ($V_T$) passing between the $CF_1$ 110-1 and $CF_2$ 110-2.

Similar to the example described in relation to FIG. 1, in this example, the $V_{CF\_1}$ monitor 112-1 monitors the $V_{CF\_1}$ 118 of the $CF_1$ 110-1 and a second flying capacitor monitor ($V_{CF\_2}$ monitor) monitors the second flying capacitor voltage ($V_{CF\_2}$) 326 of the $CF_2$ 110-2. The PFM controller 108 produces switch control signals 328 that control the operation of the switches in the first IMPM 302 and the second IMPM 304. Specifically, the PFM controller 108 may produce a first control signal ($S_{S1}$) 330 to control $S_1$ 306, a second control signal ($S_{S2}$) 332 to control $S_2$ 308, a third control signal ($S_{S3}$) 334 to control $S_3$ 310, fourth control signal (not shown) to control $S_4$ 312, a fifth control signal (not shown) to control $S_5$ 314, a sixth control signal (not shown) to control $S_{1S}$ 316, seventh control signal signal (not shown) to control $S_{2S}$ 318, an eighth control signal (not shown) to control $S_{3S}$ 320, and a ninth control signal ($S_{S4S}$) 336 to control $S_{4S}$ 322.

In this example, the two flying capacitor voltage monitors, the $V_{CF\_1}$ monitor 112-1 and $V_{CF\_2}$ monitor 112-2, are incorporated and multiplexed to a comparator (e.g., first threshold detector 142) within the voltage-level controller 104 for the difference comparisons of $V_{CF\_DV}$ 122 and the $V_{CF\_REF\_1}$ 146. In this example, only the corresponding IMPM supporting the magnetizing cycles will be monitored for the decremental voltage of its corresponding flying capacitor.

When the VDAC 106 control-code 156 is updated for a new $V_{Out}$ 134, the two voltage levels are designated to specify a voltage range (i.e., V-range 126) for output regulations. Table 1 shows the configurations of the 3-level IMPFM power converter 300 defined by the disclosed level-designation method.

TABLE 1

| Functions | Level Designations | 1st IMPM Output | 2nd IMPM Output | Conversion Ratios Vout/Vin |
|---|---|---|---|---|
| Modes | LXO Swing | LXO at phase 1 | LXO at phase 2 | (M − 2) + D |
| Boost | Range 2 ($V_{In} < V_{Out} < 2 V_{In}$) | $2 V_{IN}$ (magnetize) | $V_{In}$ (de-magnetize) | 1 + D |
| Buck | Range 1 ($0 < V_{Out} < V_{In}$) | 0 V ($S_5$ is ON) (de-magnetize) | $V_{In}$ (magnetize) | D |

In this table, M is equal to the number of levels for the IMPFM power converter and D is equal to the duty-cycle ratio. In table 2, a truth table of the PFM control-logic is shown for the 3-level IMPFM power converter 300. The PFM control-logic controls the power-switch controls over two possible voltage-ranges of output regulations. As shown in table 2, the $CF_1$ 110-1 is monitored when the VOut 134 is between two times $V_{In}$ 118 and $V_{In}$ 118 and $CF_2$ 110-2 is monitored for PFM operations in the output range between $V_{In}$ 118 and 0V.

TABLE 2

| Sub-ranges | | Phases | | LXO | $S_1$ | $S_2$ | $S_3$ | $S_4$ | $S_5$ | $S_{1S}$ | $S_{2S}$ | $S_{3S}$ | $S_{4S}$ |
|---|---|---|---|---|---|---|---|---|---|---|---|---|---|
| Range 1 | $V_{In} < V_{Out} < 2 V_{In}$ | Phase 1 | de-magnetize | $2 V_{In}$ | 1 | 0 | 1 | 0 | 0 | 0 | 1 | 0 | 1 |
| (Boost) | | Phase 2 | magnetize | $V_{In}$ | 0 | 1 | 0 | 1 | 0 | 1 | 0 | 0 | 1 |
| Range 2 | $0 < V_{Out} < V_{In}$ | Phase 1 | de-magnetize | 0 V | 0 | 1 | 0 | 1 | 1 | 0 | 1 | 0 | 1 |
| (Buck) | | Phase 2 | magnetize | $V_{In}$ | 0 | 1 | 0 | 1 | 0 | 1 | 0 | 0 | 1 |

Figure 4:
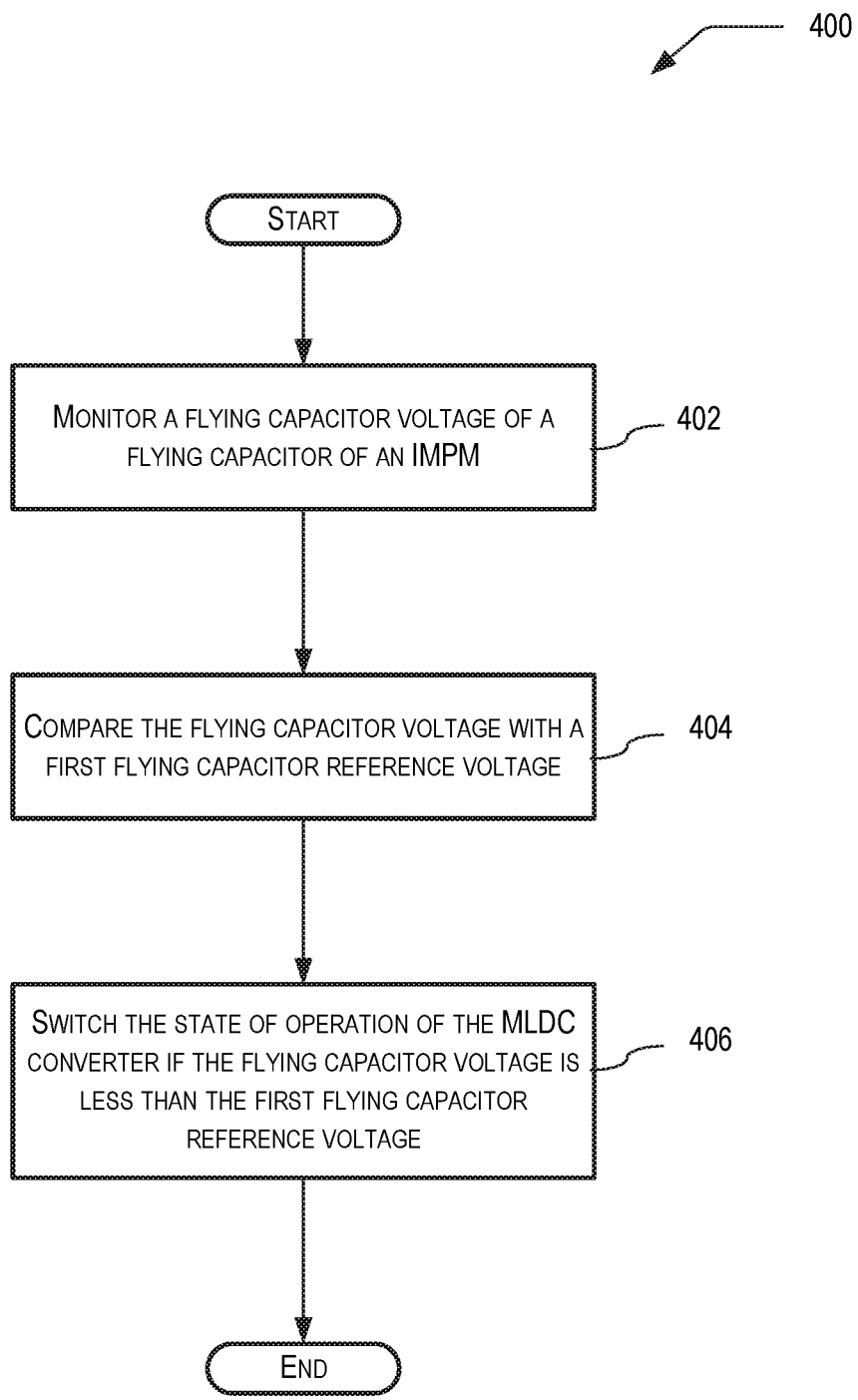
FIG. 4 is a flowchart of an example of an implementation of a method performed by the IMPFM power converter shown in FIG. 1 in accordance with the present disclosure.

Turning to FIG. 4, a flowchart of an example of an implementation of a method 400 performed by the IMPFM power converter 100 is shown in accordance with the present disclosure.

The method 400 starts by monitoring 402 a flying capacitor voltage, with a flying capacitor monitor, of a flying capacitor of an IMPM of the MLDC converter 102. The method 400 then compares 404 the flying capacitor voltage with a first flying capacitor reference voltage and switches 406 a state of operation of the MLDC converter 102 if the flying capacitor voltage is less than the first flying capacitor reference voltage. The method 400 then ends.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be perforated by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

What is claimed is:

1. An interleaved buck-boost converter, comprising:
   an input voltage terminal configured to provide an input voltage from a voltage source;
   an output filter including an inductor having an input terminal and an output capacitor for an output voltage;
   a master switching stage including a first flying capacitor;
   a slave switching stage including a second flying capacitor; and
   a controller configured during a boost mode of operation to configure the master switching stage into a master magnetizing switching state in which the input terminal is charged to a first multiple of the input voltage responsive to the output voltage being less than a first threshold voltage, and
   wherein the controller is further configured to configure the slave switching stage into a slave de-magnetizing switching state in which the input terminal is charged to a second multiple of the input voltage responsive to a first flying capacitor voltage for the first flying capacitor being less than a second threshold voltage, and wherein the controller is further configured during a buck mode of operation to configure the slave switching stage into a slave magnetizing switching state in which the input terminal is charged to the input voltage responsive to the output voltage being less than a third threshold voltage, and wherein the controller is further configured to configure the master switching stage into a master de-magnetizing switching state in which the input terminal is discharged to ground responsive to a second flying capacitor voltage for the second flying capacitor being less than a fourth threshold voltage, and
   wherein the second multiple of the input voltage is less than the first multiple of the input voltage.

2. The interleaved buck-boost converter of claim 1, wherein the controller includes:
   a first comparator configured to compare the output voltage to the first threshold voltage; and
   a second comparator configured to compare the first flying capacitor voltage to the second threshold voltage.

3. The interleaved buck-boost converter of claim 2, further including:
   a first flying capacitor monitor configured to measure the first flying capacitor voltage;
   a second flying capacitor monitor configured to measure the second flying capacitor voltage; and
   an analog multiplexer (AMUX),
   wherein the controller includes a voltage-level controller including the first comparator and the second comparator,
   wherein the AMUX is in signal communication with the first flying capacitor monitor, the second flying capacitor monitor, and the voltage-level controller, and
   wherein the AMUX is configured to receive the measured first flying capacitor voltage and the measured second flying capacitor voltage and transmit a selected measured flying capacitor voltage to the voltage-level controller.

4. The interleaved buck-boost converter of claim 3,
   wherein the controller further includes a pulse frequency modulation (PFM) controller in signal communication with the master switching stage, slave switching stage, and voltage-level controller,
   wherein during the boost mode of operation, the PFM controller is configured to receive an output comparison signal produced by the voltage-level controller and, in response, produce a first control signal that is input to the master switching stage, wherein the output comparison signal is produced by comparing the output voltage against the first threshold voltage and the first control signal configures the master switching stage into the master magnetizing switching state, and
   wherein the PFM controller is also configured to receive a flying capacitor comparison signal produced by the voltage-level controller and, in response, produce a second control signal that is input to the slave switching stage, wherein the flying capacitor comparison signal is produced in response to the first flying capacitor voltage being less than the second threshold voltage and the second control signal configures the slave switching stage into the slave de-magnetizing switching state.

5. The interleaved buck-boost converter of claim 4,
   wherein the PFM controller is further configured during the buck mode of operation to configure the slave switching stage into the slave magnetizing switching state, and
   wherein the PFM controller is further configured to configure the master switching stage into the master de-magnetizing switching state.

6. The interleaved buck-boost converter of claim 5, further including a voltage digital-to-analog converter (VDAC) in signal communication with the voltage-level controller, wherein the VDAC is configured to receive control codes and, in response, produce a reference flying capacitor voltage.

7. The interleaved buck-boost converter of claim 6, wherein the first comparator is a first threshold detector and the second comparator is a second threshold detector.

8. The interleaved buck-boost converter of claim 1,
   wherein the master switching stage is a four-switch master switching stage, and
   wherein the slave switching stage is a four-switch slave switching stage.

9. The interleaved buck-boost converter of claim 1,
   wherein the first multiple of the input voltage equals twice the input voltage, and
   wherein the second multiple of the input voltage equals one times the input voltage.

10. The interleaved buck-boost converter of claim 1,
    wherein the first multiple of the input voltage equals three times the input voltage, and
    wherein the second multiple of the input voltage equals two times the input voltage.

11. The interleaved buck-boost converter of claim 1, wherein the master switching stage is a first interleaved multi-level power module (IMPM) and the slave switching stage is a second IMPM, wherein the first IMPM and the second IMPM are part of a multi-level direct current (DC) to DC converter (MLDC converter), and wherein the MLDC converter includes more IMPMs than the first IMPM and the second IMPM.

12. A control system for controlling an interleaved multi-level pulse frequency modulated (IMPFM) power converter having an input voltage terminal configured to provide an input voltage from a voltage source, wherein the IMPFM is in signal communication with an output filter including an inductor having an input terminal and an output capacitor for an output voltage, the control system comprising:
- a first flying capacitor monitor in signal communication with a first flying capacitor of a first interleaved multi-level power module (IMPM) of a multi-level direct current (DC) to DC converter (MLDC converter) of the IMPFM power converter, wherein the first IMPM is a master switching stage;
- a second flying capacitor monitor in signal communication with a second flying capacitor of a second IMPM of the MLDC converter, wherein the second IMPM is a slave switching stage;
- a controller configured during a boost mode of operation to configure the first IMPM into a master magnetizing switching state in which the input terminal is charged to a first multiple of the input voltage responsive to the output voltage being less than a first threshold voltage, and
- wherein the controller is further configured to configure the second IMPM into a slave de-magnetizing switching state in which the input terminal is charged to a second multiple of the input voltage responsive to a first flying capacitor voltage for the first flying capacitor being less than a second threshold voltage, and wherein the controller is further configured during a buck mode of operation to configure the slave switching stage into a slave magnetizing switching state in which the input terminal is charged to the input voltage responsive to the output voltage being less than a third threshold voltage, and wherein the controller is further configured to configure the master switching stage into a master de-magnetizing switching state in which the input terminal is discharged to ground responsive to a second flying capacitor voltage for the second flying capacitor being less than a fourth threshold voltage, and
- wherein the second multiple of the input voltage is less than the first multiple of the input voltage.

13. The control system of claim 12, wherein the controller includes:
- a first comparator configured to compare the output voltage to the first threshold voltage; and
- a second comparator configured to compare the first flying capacitor voltage to the second threshold voltage.

14. The control system of claim 13,
further including:
- a first flying capacitor monitor configured to measure the first flying capacitor voltage;
- a second flying capacitor monitor configured to measure the second flying capacitor voltage; and
- an analog multiplexer (AMUX), wherein the controller includes a voltage-level controller including the first comparator and the second comparator,
wherein the AMUX is in signal communication with the first flying capacitor monitor, the second flying capacitor monitor, and the voltage-level controller, and
wherein the AMUX is configured to receive the measured first flying capacitor voltage and measure second flying capacitor voltage, and transmit a selected measured flying capacitor voltage to the voltage-level controller.

15. The control system of claim 13,
wherein the controller further includes a pulse frequency modulation (PFM) controller in signal communication with the master switching stage, slave switching stage, and voltage-level controller,
wherein during the boost mode of operation, the PFM controller is configured to receive an output comparison signal produced by the voltage-level controller and, in response, produce a first control signal that is input to the master switching stage, wherein the output comparison signal is produced by comparing the output voltage against the first threshold voltage and the first control signal configures the master switching stage into the master magnetizing switching state,
wherein the PFM controller is also configured to receive a flying capacitor comparison signal produced by the voltage-level controller and, in response, produce a second control signal that is input to the slave switching stage, wherein the flying capacitor comparison signal is produced in response to the first flying capacitor voltage being less than the second threshold voltage and the second control signal configures the slave switching stage into the slave de-magnetizing switching state,
wherein the PFM controller is further configured during the buck mode of operation to configure the slave switching stage into the slave magnetizing switching state, and
wherein the PFM controller is further configured to configure the master switching stage into the master de-magnetizing switching state.

16. The control system of claim 15, further including a voltage digital-to-analog converter (VDAC) in signal communication with the voltage-level controller, wherein the VDAC is configured to receive control codes and, in response, produce a reference flying capacitor voltage.

17. The control system of claim 12,
wherein the first multiple of the input voltage equals twice the input voltage, and
wherein the second multiple of the input voltage equals one times the input voltage.

18. The control system of claim 12,
wherein the first multiple of the input voltage equals three times the input voltage, and
wherein the second multiple of the input voltage equals two times the input voltage.

* * * * *